United States Patent
Nixon et al.

(10) Patent No.: US 9,442,815 B2
(45) Date of Patent: Sep. 13, 2016

(54) DISTRIBUTED ON-CHIP DEBUG TRIGGERING WITH ALLOCATED BUS LINES

(71) Applicants: Scott P. Nixon, Fort Collins, CO (US); Eric M. Rentschler, Windsor, CO (US)

(72) Inventors: Scott P. Nixon, Fort Collins, CO (US); Eric M. Rentschler, Windsor, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 145 days.

(21) Appl. No.: 13/665,719

(22) Filed: Oct. 31, 2012

(65) Prior Publication Data

US 2014/0122929 A1     May 1, 2014

(51) Int. Cl.
| | |
|---|---|
| G06F 11/36 | (2006.01) |
| G06F 11/27 | (2006.01) |
| G06F 11/30 | (2006.01) |
| G06F 11/34 | (2006.01) |

(52) U.S. Cl.
CPC ........... *G06F 11/27* (2013.01); *G06F 11/3065* (2013.01); *G06F 11/348* (2013.01); *G06F 11/3656* (2013.01); *G06F 11/3648* (2013.01); *G06F 2201/86* (2013.01)

(58) Field of Classification Search
CPC ................... G06F 11/3648; G06F 11/3656
USPC ............................................. 714/31, 48, 57
See application file for complete search history.

(56) References Cited

U.S. PATENT DOCUMENTS

| | | | |
|---|---|---|---|
| 5,483,518 A * | 1/1996 | Whetsel | 370/241 |
| 5,771,240 A | 6/1998 | Tobin et al. | |
| 5,951,696 A | 9/1999 | Naaseh et al. | |
| 6,308,282 B1 * | 10/2001 | Huang et al. | 714/4.3 |
| 6,502,210 B1 | 12/2002 | Edwards | |
| 6,751,751 B1 | 6/2004 | Murray et al. | |
| 6,757,846 B1 | 6/2004 | Murray et al. | |
| 6,760,867 B2 | 7/2004 | Floyd et al. | |
| 7,010,672 B2 | 3/2006 | Ahmad et al. | |
| 7,013,409 B2 | 3/2006 | Gergen et al. | |
| 7,107,489 B2 | 9/2006 | Gergen et al. | |
| 7,149,926 B2 | 12/2006 | Ahmad et al. | |
| 7,613,955 B2 | 11/2009 | Arnold | |
| 7,664,052 B2 * | 2/2010 | Oku et al. | 370/254 |
| 7,770,073 B2 | 8/2010 | Fashchik et al. | |
| 8,566,645 B2 | 10/2013 | Rentschler et al. | |
| 8,635,497 B2 | 1/2014 | Miller et al. | |
| 8,683,265 B2 * | 3/2014 | Rentschler et al. | 714/30 |

(Continued)

FOREIGN PATENT DOCUMENTS

EP         0638834         2/1995

OTHER PUBLICATIONS

Debunking the 100X GPU vs. CPU myth: an evaluation of throughput computing on CPU and GPU by Lee ISCA 2010 Proceedings of the 37th annual international symposium on Computer architecture pp. 451-460, ACM New York, NY, ISBN: 978-1-4503-0053-7.*

(Continued)

*Primary Examiner* — Joseph Schell

(57) ABSTRACT

A method and apparatus for distributed on-chip debug triggering is presented. A first bus includes a plurality of lines and a debugging state machine configurable to monitor the plurality of lines of the first bus. One or more nodes are configurable to detect triggering events and provide, in response to detecting one or more triggering events, signals to the debugging state machine using a first subset of the plurality of lines that is allocated to the node(s).

15 Claims, 9 Drawing Sheets

(56) References Cited

U.S. PATENT DOCUMENTS

| | | |
|---|---|---|
| 8,825,922 B2 | 9/2014 | Mayer et al. |
| 2004/0250164 A1 | 12/2004 | Ahmad et al. |
| 2005/0034017 A1 | 2/2005 | Airaud et al. |
| 2006/0150023 A1 | 7/2006 | Hasebe et al. |
| 2006/0236189 A1* | 10/2006 | Kato et al. .................. 714/748 |
| 2007/0079288 A1 | 4/2007 | Willwerth et al. |
| 2007/0174679 A1* | 7/2007 | Chelstrom .......... G06F 11/2236 714/6.13 |
| 2009/0271553 A1* | 10/2009 | Gang et al. .................. 710/305 |
| 2012/0144240 A1 | 6/2012 | Rentschler et al. |
| 2012/0185730 A1 | 7/2012 | Moran et al. |
| 2012/0233504 A1* | 9/2012 | Patil et al. ...................... 714/30 |
| 2014/0122929 A1 | 5/2014 | Nixon et al. |

OTHER PUBLICATIONS

How debuggers work: Part 2—Breakpoints Eli Bendersky's Website, Jan. 27, 2011 http://eli.thegreenplace.net/2011/01/27/how-debuggers-work-part-2-breakpoints.*

* cited by examiner

DISTRIBUTED ON-CHIP DEBUG TRIGGERING WITH ALLOCATED BUS LINES

BACKGROUND

This application relates generally to processor-based systems, and, more particularly, to debugging in processor-based systems.

Conventional processor-based systems from personal computers to mainframes typically include a central processing unit (CPU) that is configured to access instructions or data that are stored in a main memory. Processor-based systems may also include other types of processors such as graphics processing units (GPUs), digital signal processors (DSPs), accelerated processing units (APUs), co-processors, or applications processors. Entities within the conventional processor-based system communicate by exchanging signals over buses or bridges such as a northbridge, a southbridge, a Peripheral Component Interconnect (PCI) Bus, a PCI-Express Bus, or an Accelerated Graphics Port (AGP) Bus.

Some or all of the processors, buses, or bridges in the processor-based system may be fabricated on an integrated circuit (IC) using a circuit design created by engineers, typically using automated design software. The design of an IC for a system, which may include multiple ICs, is typically verified using a suite of tests to ensure that the IC functions correctly. Testing of the IC during the design, development, fabrication, or operational stages is generally referred to as debugging the IC. The evolution of processing technologies, the reduction of the size of features on the IC, and the increase in complexity of devices implemented on an IC, have increased the complexity and difficulty of debugging circuit designs using traditional simulation tools and techniques. For example, when an error is detected during debugging, designers may attempt to tap signals of interest from the circuit and use a logic analyzer to determine the cause of the error. However, this is a difficult process and is often not effective at least in part because errors that have already occurred are difficult to repeat and reconstruct.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

Triggering of a conventional centralized debug state machine may be limited by the data bandwidth of the debug bus or by debug bus selection choices. Moreover, a conventional centralized debug state machine has a limited amount of resources available for detecting triggers and generating or issuing actions in response to the triggers, which limits the flexibility of a centralized debugger. The trigger-to-action latency of the debugging infrastructure can be higher than the latency of the associated pipeline, in which case it may be difficult or impossible for the debugger to address some critical debugging issues. Embodiments of the techniques described herein may solve or mitigate some or all of these deficiencies in the conventional practice.

In some embodiments, an apparatus is provided for distributed on-chip debug triggering. Some embodiments of the apparatus includes a first bus including a plurality of lines and a debugging state machine configurable to monitor the plurality of lines of the first bus. The embodiments of the apparatus also include one or more nodes configurable to detect triggering events and provide, in response to detecting one or more triggering events, signals to the debugging state machine using a first subset of the plurality of lines that is allocated to the node(s).

In some embodiments, a method is provided for distributed on-chip debug triggering. Some embodiments of the method include detecting one or more triggering events at one of a plurality of nodes that are communicatively coupled to a debugging state machine. These embodiments of the method also include providing signals from the node to the debugging state machine in response to detecting the triggering event(s). The signals are provided using a first subset of plurality of lines of a first bus. The first set is allocated to the node.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
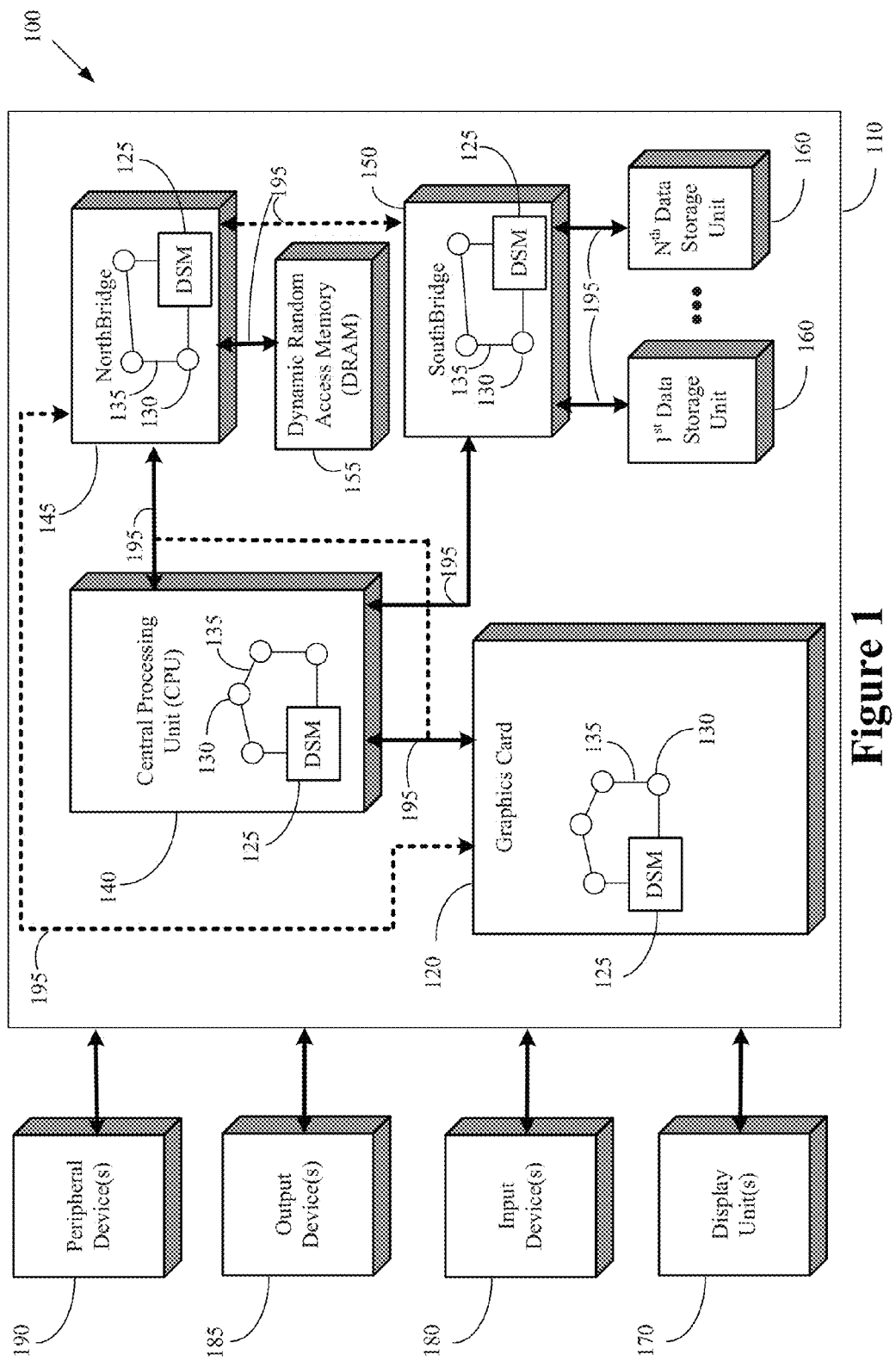
FIG. 1 conceptually illustrates a first example of a processor-based system, in accordance with some embodiments.

While the disclosed subject matter may be modified and may take alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the disclosed embodiments with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined to form new embodiments.

Conventional processor-based systems may implement a centralized debugging entity such as a debug state machine (DSM). The DSM receives signals from other entities within the system over a debug bus. The received signals can be used to detect trigger events, e.g., using pattern matching, field comparisons, permutation logic, or the like. The DSM may initiate actions in response to detecting trigger events. The actions may include stopping clocks, entering a processor debug mode, issuing interrupt code, controlling debug trace storage, or asserting a local irritator like a stall. However, the capacity of the debug bus is limited and may not be sufficient to transport triggering information or related trace information from multiple data sources scattered throughout the processor-based system. Furthermore, routing of the information from the multiple data sources to the centralized DSM may be complicated.

Instantiating multiple independent DSM modules in different die regions may not be possible because of design costs imposed by timing constraints and the limited area available on the die. Moreover, multiple independent DSM modules may not be able to detect triggering events that are based on signals received from multiple die regions without additional logic circuitry to coordinate operation of the multiple independent debug state machines. Coordinating the operation of different DSM modules also increases the trigger-to-action latency of the debugging infrastructure. Debugging, bug patches, workarounds, or validation procedures may be difficult or impossible to perform correctly if the latency of the debugging infrastructure becomes higher than the latency of the pipeline being monitored by the debugging infrastructure. For example, long trigger-to-action latencies may make it difficult or impossible to delay pipeline operations long enough to allow the debugging infrastructure to process triggers from the pipeline and generate actions that can be applied to the pipeline to patch or workaround a bug that generated the trigger.

At least in part to address these deficiencies in the conventional practice, some embodiments support the collection of debugging information locally at nodes that are distributed throughout the processor-based system. Each node may be allocated a subset of the lines of a global debug bus for communicating with a centralized DSM. The nodes may also monitor data traffic on a local bus. The nodes can detect local trigger events, which are defined herein as trigger events generated by circuitry that is communicatively coupled to the local bus so that signals indicating the trigger events can be conveyed to the node over the local bus. Exemplary local trigger events may be generated using pattern matching, field comparisons, or permutation logic to identify states or activities that may indicate an error has occurred or a bug has been detected. The nodes may also be configured to transmit a trigger signal over their subset of lines of the global debug bus to the centralized DSM. Other data such as trace information can also be transmitted using the subset of lines. For example, a node may be allocated eight lines of a 32-bit bus and may use one line to transmit a trigger to the centralized DSM in response to detecting a triggering event. The remaining seven lines may be used to transmit trace information associated with the triggering event or other data. The DSM may then use the trigger received over the debug bus (as well as the associated data) to initiate one or more actions, potentially in combination with triggers received from other nodes or other data received on the debug bus. In some embodiments, the nodes also initiate actions in response to detecting trigger events. The actions initiated by the centralized DSM or the nodes may include stopping clocks, entering a processor debug mode, issuing interrupt code, controlling debug trace storage, or asserting a local irritator such as a stall. In some embodiments, the processing capacity of the nodes is smaller than the processing capacity of the centralized DSM. For example, the centralized DSM may be configured to perform approximately ten times as many floating-point operations per second (flops) as the nodes.

FIG. 1 conceptually illustrates a first example of a processor-based system 100, according to some embodiments. In some embodiments, the processor-based system 100 includes a personal computer, a laptop computer, a handheld computer, a netbook computer, an ultrabook computer, a mobile device, a smart phone, a tablet, a telephone, a personal data assistant, a server, a mainframe, a work terminal, or the like. As illustrated, the computer system 100 includes a main structure 110 which may include a computer motherboard, system-on-a-chip, circuit board or printed circuit board, a desktop computer enclosure or tower, a laptop computer base, a server enclosure, part of a mobile device, tablet, personal data assistant, or the like. In some embodiments, the processor-based computer system 100 runs an operating system such as Linux, UNIX, Windows, Mac OS, or the like.

As illustrated, the main structure 110 includes a graphics card 120. The graphics card 120 may also be connected on a Peripheral Component Interconnect (PCI) Bus (not shown), PCI-Express Bus (not shown), an Accelerated Graphics Port (AGP) Bus (not shown), or other electronic or communicative connection. The graphics card 120 may be referred to as a circuit board or a printed circuit board or a daughter card or the like. For example, semiconductor devices used to form the graphics card 120 may be formed on a single substrate.

The processor-based computer system 100 shown in FIG. 1 also includes a central processing unit (CPU) 140, which is physically, electromagnetically, or communicatively coupled to a northbridge 145. The CPU 140 and northbridge 145 may be housed on the motherboard (not shown) or some other structure of the processor-based computer system 100. It is contemplated that in some embodiments, the graphics card 120 may be coupled to the CPU 140 via the northbridge 145 or some other electronic or communicative connection, as discussed herein. For example, CPU 140, northbridge 145, graphics card 120 may be included in a single package or as part of a single die or "chip." In some embodiments, the northbridge 145 is coupled to a system RAM 155 (e.g., DRAM) and in some embodiments the system RAM 155 is coupled directly to the CPU 140. The system RAM 155 may be of any RAM type known in the art and does not limit the disclosed embodiments. In some embodiments, the northbridge 145 is connected to a southbridge 150. The northbridge 145 and southbridge 150 may be on the same chip in the processor-based system 100 may be on different chips. In some embodiments, the southbridge 150 is connected to one or more data storage units 160. The data storage units 160 may be hard drives, solid state drives, magnetic tape, or any other writable media used for storing data. The CPU 140, northbridge 145, southbridge 150, graphics processing unit 120, or system RAM 155 may be a computer chip or a silicon-based computer chip, or may be part of a computer chip or a silicon-based computer chip. The various components of the processor-based system 100 may be operatively, electromagnetically or physically connected or linked with a connection 195 or more than one connection 195. As illustrated, the connections 195 include network connections such as 10/100/1000 Ethernet connections. However, persons of ordinary skill in the art having benefit of the present disclosure should appreciate that embodiments may use different connections 195. For example, the connections 195 may be network connections that operate according to different speeds (e.g., speeds lower than 10 Gbe or higher than 1000 Gbe) and in some cases the connections 195 may also include other buses such as PCI or PCIe buses.

The processor-based system 100 may be connected to one or more display units 170, input devices 180, output devices 185, or peripheral devices 190. In some embodiments, these elements are internal or external to the processor-based system 100 and may be wired or wirelessly connected. The display units 170 may be internal or external monitors, television screens, handheld device displays, touch pads, touch-sensitive screens, and the like. The input devices 180 may be any one of a keyboard, mouse, track-ball, stylus, mouse pad, mouse button, joystick, touch-sensitive screen, scanner or the like. The output devices 185 may be any one of a monitor, printer, plotter, copier, or other output device.

The peripheral devices 190 may be any other device that can be coupled to a computer. Peripheral devices 190 may include a CD/DVD drive capable of reading or writing to physical digital media, a USB device, Zip Drive, external floppy drive, external hard drive, thumb drive, phone or broadband modem, router/gateway, access point or the like.

One or more DSMs 125 may be implemented in the processor-based system 100 and may be used to debug operations performed by the processor-based system 100 or entities within the processor-based system 100. As illustrated, embodiments of the DSM 125 may be implemented in the graphics card 120, CPU 140, northbridge 145, southbridge 150, or elsewhere within the processor-based system 100. As discussed herein, embodiments of the DSM 125 may be physically, electromagnetically, or communicatively coupled to a bus (not shown in FIG. 1) that may be used to convey signals related to debugging such as debugging triggers or actions. Embodiment of the bus may be used to exchange signals between different embodiments of the DSM 125 or other entities within the processor-based system 100 or entities that are physically, electromagnetically, or communicatively coupled to the processor-based system 100, e.g., to support triggering, cross-triggering, capture, or other operations.

One or more of the DSMs 125 may be physically, electromagnetically, or communicatively coupled to one or more nodes 130. The nodes 130 may be configured to monitor signals to detect triggering events such as events that may be used to trigger debug actions. For example, nodes 130 may be distributed throughout the graphics card 120 and each node 130 in the graphics card 120 may be used to monitor signals on a local bus associated with operations performed by a subset of the logic implemented on the graphics card 120. Nodes 130 may implement a subset of the functionality implemented in DSMs 125 and may therefore be less complex than a DSM 125 and able to perform fewer operations per second than the DSM 125 For example, the DSM 125 may be configurable to perform approximately 5000-10,000 flops and the corresponding nodes 130 may be configurable to perform 100-1000 flops. The nodes 130 may also consume a smaller amount of area on the die relative to the DSM 125.

As illustrated, the nodes 130 communicate with a corresponding DSM 125 over a bus 135. For example, a node 130 may assert a trigger event on a bus 135 in response to detecting a pattern of signals corresponding to the trigger event. As used herein, the term "trigger event" refers to detected signals that indicate a state or activity within the processor-based system 100 that may be used to initiate, or "trigger," some action within the processor-based system 100. For example, trigger events may be asserted to indicate that an error may have occurred or a bug may have been detected. The trigger event may be used to trigger a debug action that is intended to correct the error or bug. The DSM 125 may then generate a debug action in response to detecting the trigger event on the bus 135. In some embodiments, one or more of the nodes 130 include logic for responding to a configurable subset of the trigger events, e.g., by generating debug actions in response to detecting a corresponding trigger event.

Figure 2:
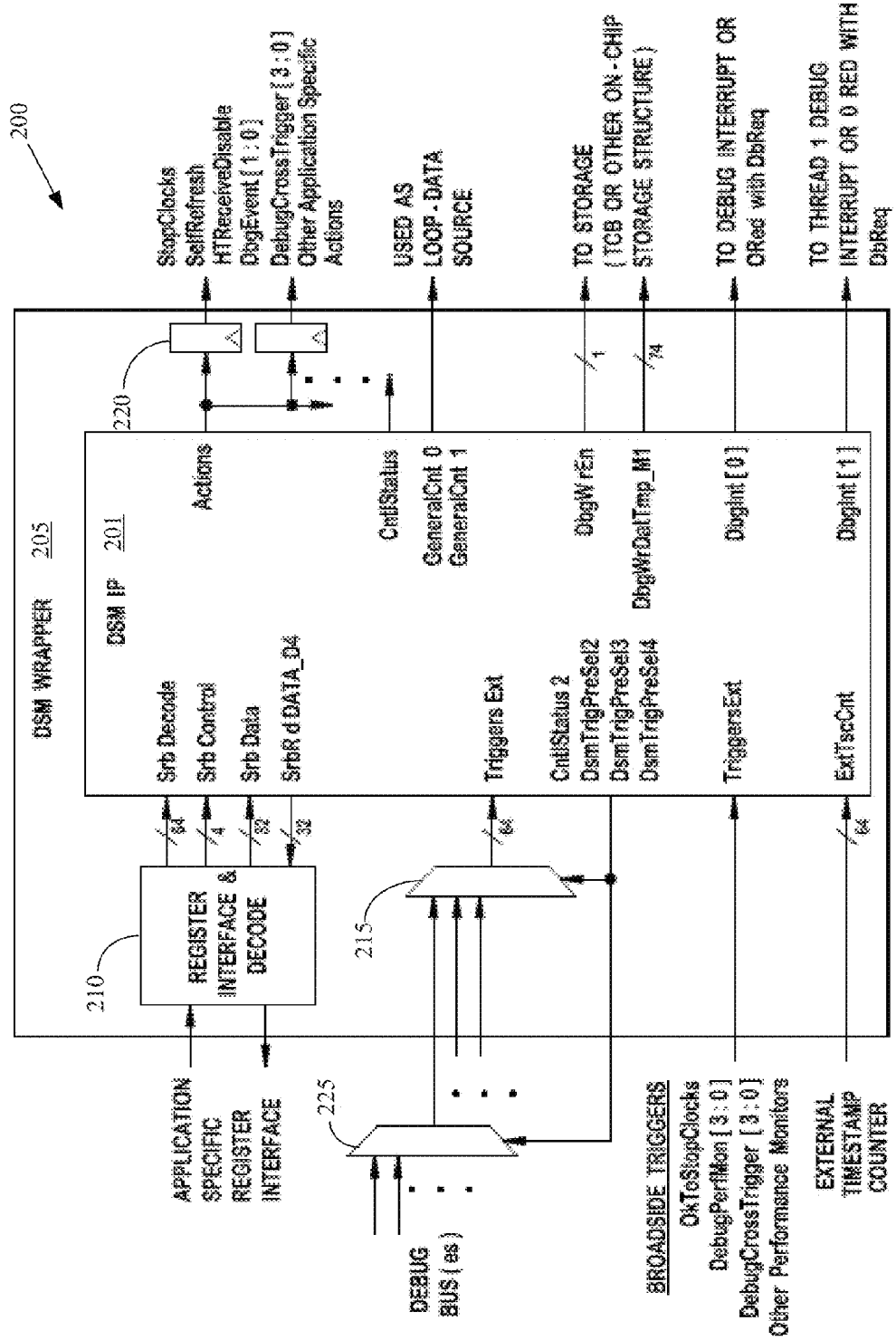
FIG. 2 conceptually illustrates an example of an interface to a debugging state machine, in accordance with some embodiments.

FIG. 2 conceptually illustrates an example of an interface 200 to a DSM 201, according to some embodiments. As illustrated, the interface 200 may be used as the interface for debugging state machines such as the DSM 125 shown in FIG. 1. Embodiments of the interface 200 may have interfaces for clock signals, triggers, actions, special register bus (SRB) accesses, an external timestamp counter, control and status registers, debug interrupts, debug bus interfaces, general counters, control signals, etc. As illustrated, portions of the interfaces may be implemented using a DSM wrapper 205 that may include a register interface and decoder 210, trigger multiplexers 215, flip-flops 220, or other functionality. Additional multiplexers 225 may also be used for multiplexing information received from a debug bus. Table 1 shows example DSM interfaces that may be provided for the DSM 201. The DSM 201 may include one or more of the interfaces listed in Table 1 depending on the application. Nodes connected to the DSM 201 such as the nodes 130 shown in FIG. 1 may also include subsets of the interfaces listed in Table 1.

TABLE 1

| Signal Name | I/O | Comments |
|---|---|---|
| CCLK | I | Global Clock |
| SC1 | I | Scan clock 1 |
| SC2 | I | Scan clock 2 |
| R | I | Reset |
| ScanShiftEn | I | Enable for scan shift mode |
| ClockGater | I | Clock gater input. |
| Triggers | | |
| TriggersExt | I | Triggers inbound to the DSM. |
| Actions | | |
| Actions | O | Actions outbound from the DSM. |
| SRB Access | | |
| RegDat | I | Write Data for DSM registers. |
| RegWrEnLo | I | Write signal for lower 32 bits. |
| RegWrEnHi | I | Write signal for upper 32 bits. |
| RegRdEn | I | Read select signal. 0: lower 32 bits, 1: upper 32 bits. |
| RegAccessGater | I | Flop gating for read return path flops. This signal is generated in the wrapper and is passed into the DSM for reducing CAC. |
| RegDecode | I | One-hot bus that is a decode for each DSM register access. The decoding is performed within the DSM wrapper such that each application can do its own debug. |
| RegRdData | O | Read-return data from the DSM. |
| External Timestamp Counter | | |
| ExtTscCnt | I | External timestamp counter input. The DSM may use its own internal timestamp counter or an external source. |
| Control and Status Registers | | |
| CntlStatus | O | Main control register for the DSM. |
| CntlStatus2 | O | Application specific control register for the DSM. |
| Miscellaneous Wrapper Control | | |
| DsmTrigPreSel2 | O | Additional application specific control register |
| DsmTrigPreSel3 | O | for the DSM. |
| DsmTrigPreSel4 | O | |
| Debug Interrupt(s) | | |
| DbgInt[0] | O | Debug interrupt signal. |
| DbgInt[1] | O | Debug interrupt signal. |
| Debug Bus Interface | | |
| DebugBusIn | I | Debug bus input port. |
| DebugTraceWrEn | O | |
| DebugTraceWrData | O | |
| General Counters | | |
| GeneralCnt0 | O | May be used as source data to place onto the |
| GeneralCnt1 | O | debug bus in a wrap-around mode to use for continuity testing. |

Embodiments of systems such as the processor-based system 100 shown in FIG. 1 may support scan capabilities so that the state of the processor arrays may be accessed by stopping clocks and scanning out information through the scan ports. The interface 200 may support this functionality by incorporating a separate set of pins (SC1 and SC2) for a scan clock. A trigger interface (TriggersExt) may be provided for inbound triggers to the DSM from the debug buses and broadside triggers. The broadside triggers include a signal to stop clock signals (OKToStopClocks), performance monitors, errors, breakpoints, cross-triggers from other DSM(s), etc. The actions interface (Actions) is for an outbound signal from the DSM for a specific action based on a trigger or a sequence of triggers. The SRB access interfaces (RegDat, RegWrEn, RegAccessGater, RegDecode, RegRdData) are provided for reading and writing data from and to the DSM registers. The DSM may use its own internal timestamp counter. Alternatively, the DSM may have an interface for an external timestamp counter input (ExtTscCnt) so that a global timestamp may be used across the DSMs. The control and status registers (CntlStatus, CntlStatus2, DsmTrigPreSel*) are for controlling the DSM. The debug interrupt interfaces (DbgInt) are for interrupting the microcode, etc., and may be ORed with the conventional debug request signal or may form a dedicated debug interrupt signal. The debug bus interfaces (DebugBusIn, DebugTraceWrEn, DebugTraceWrData) are for controlling and sending debug information to a storage unit, e.g., the system RAM 155 or data storage units 160 shown in FIG. 1. Additional description of the DSM and related interfaces may be found in "Debug state machine and processor including the same," Ser. No. 12/958,585, which was filed on Dec. 2, 2010 and which is hereby incorporated by reference into the present application in its entirety.

Figure 3:
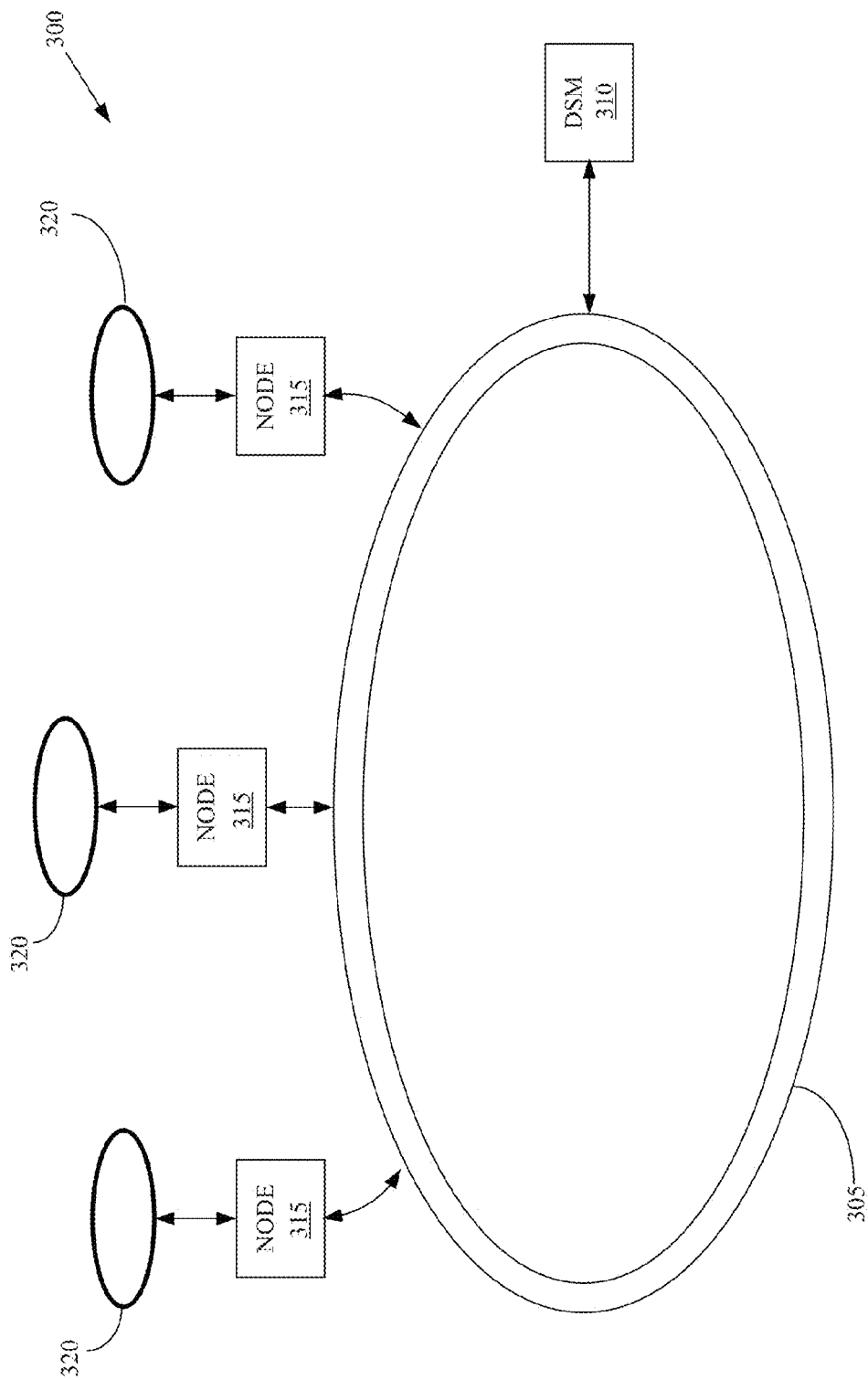
FIG. 3 conceptually illustrates a system for communicating signals generated on a local bus to a DSM coupled to a global bus, in accordance with some embodiments.

FIG. 3 conceptually illustrates a a processor-based system 300 (e.g., the processor-based system 100) for communicating signals generated on a local bus to a DSM coupled to a global bus. As illustrated, the processor-based system 300 includes a global bus 305, a DSM 310, nodes 315, and local buses 320. In some embodiments, the global bus 305, the nodes 315, and the DSM 310 correspond to the bus 135, the nodes 130, and the DSM 125, respectively. The global bus 304 includes a plurality of lines for conveying signals related to debugging of the processor-based system 300. The DSM 310 is physically, electromagnetically, or communicatively coupled to the lines of the global bus 305 so that the DSM 310 can assert signals onto the lines of the global bus 305, monitor signals provided by other devices, or receive information conveyed by the lines of the global bus 305.

Nodes 315 are also physically, electromagnetically, or communicatively coupled to the global bus 305. In some embodiments, each node 315 is assigned or allocated a subset of the lines of the global bus 305 so that the DSM 310 can unambiguously identify the signals asserted onto the global bus 305 by the different nodes 315. For example, each node 315 may be allocated a mutually exclusive subset of the lines of the global bus 305. The DSM 310 can then unambiguously identify signals asserted by each node 315 because the DSM 310 receives the signals on at least one of the subset of lines allocated to the corresponding node 315.

The nodes 315 are configurable to monitor signals transmitted on a corresponding local bus 320. In some embodiments, the nodes 315 detect trigger events by monitoring signals on the local bus 320 events, e.g., using pattern matching, field comparisons, permutation logic, or the like. The node 315 may then provide a signal on its subset of lines of the global bus 305 to signal the trigger event to the DSM 310. For example, the trigger event can be signaled using a single bit value transmitted on a single line of the global bus 305. Alternatively, trigger events may be signaled using a series of bit values transmitted on a single line or multiple bit values transmitted concurrently or in parallel on multiple lines of the global bus 305. If other lines are available in the subset and they are not used to signal the trigger event, additional data such as trace information related to the trigger event may be transmitted on the available lines of the global bus 305 concurrently or in parallel with the signals indicating the trigger event.

Figure 4A:
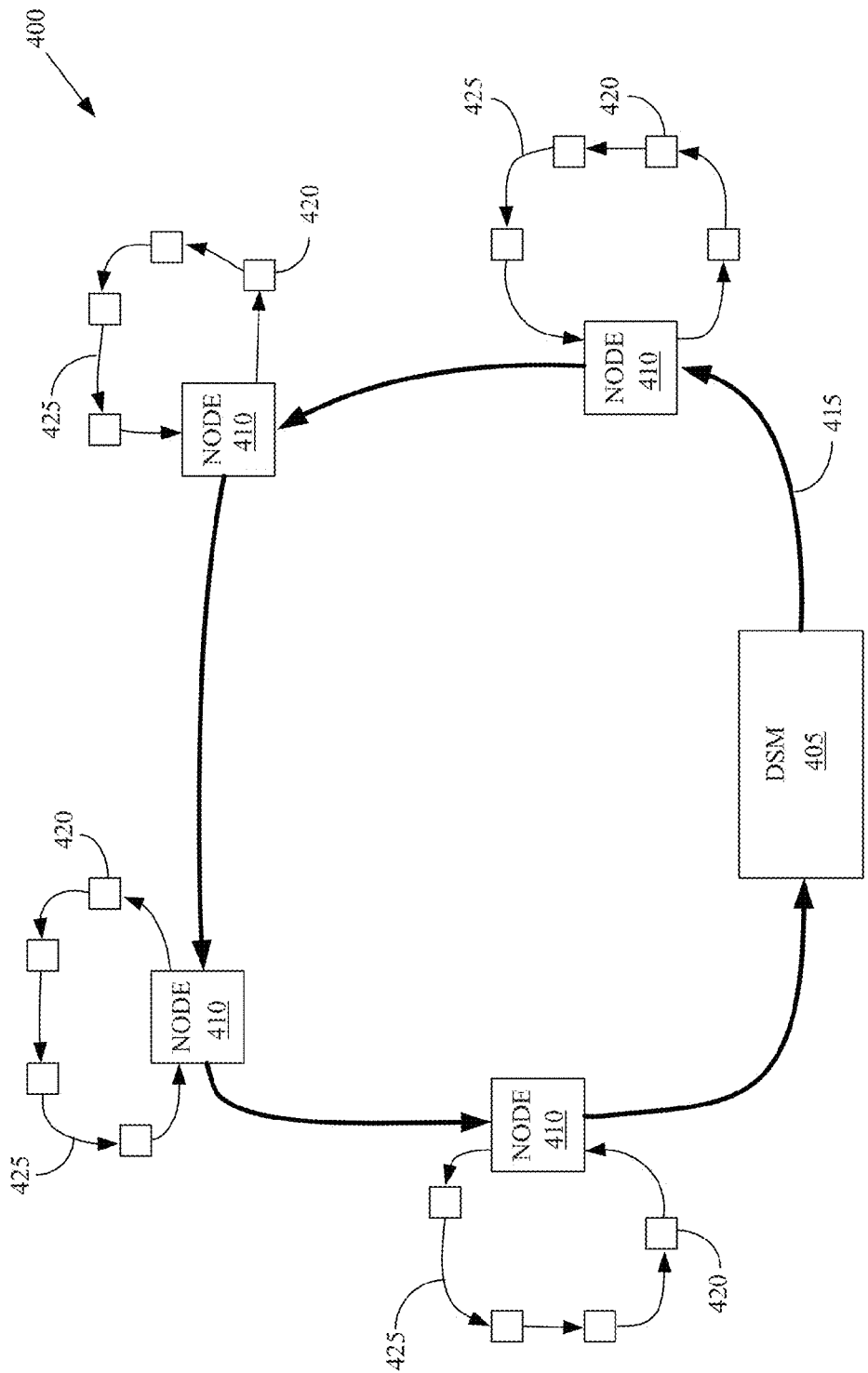
FIG. 4A conceptually illustrates a system for communicating signals generated on a local ring bus to a DSM coupled to a global ring bus, in accordance with some embodiments.

FIG. 4A conceptually illustrates a processor-based system 400 (e.g., the processor-based system 100) for communicating signals generated on a local ring bus to a DSM coupled to a global ring bus, according to some embodiments. As illustrated, the processor-based system 400 includes a global ring bus 415, a DSM 405, nodes 410, local ring buses 425, and blocks 420. In some embodiments, the global ring bus 415, the nodes 410, and the DSM 405 correspond to the bus 135, the nodes 130, and the DSM 125, respectively. In some embodiments, different subsets of the lines of the global ring bus 415 are allocated to the different nodes 410 so that the DSM 405 can unambiguously identify signals transmitted over the bus by the different nodes 410. The nodes 410 monitor signals generated by logical entities or the blocks 420 using corresponding local ring buses 425. Ring buses are well-known in the art and, in the interest of clarity, are not discussed in detail herein.

Figure 4B:
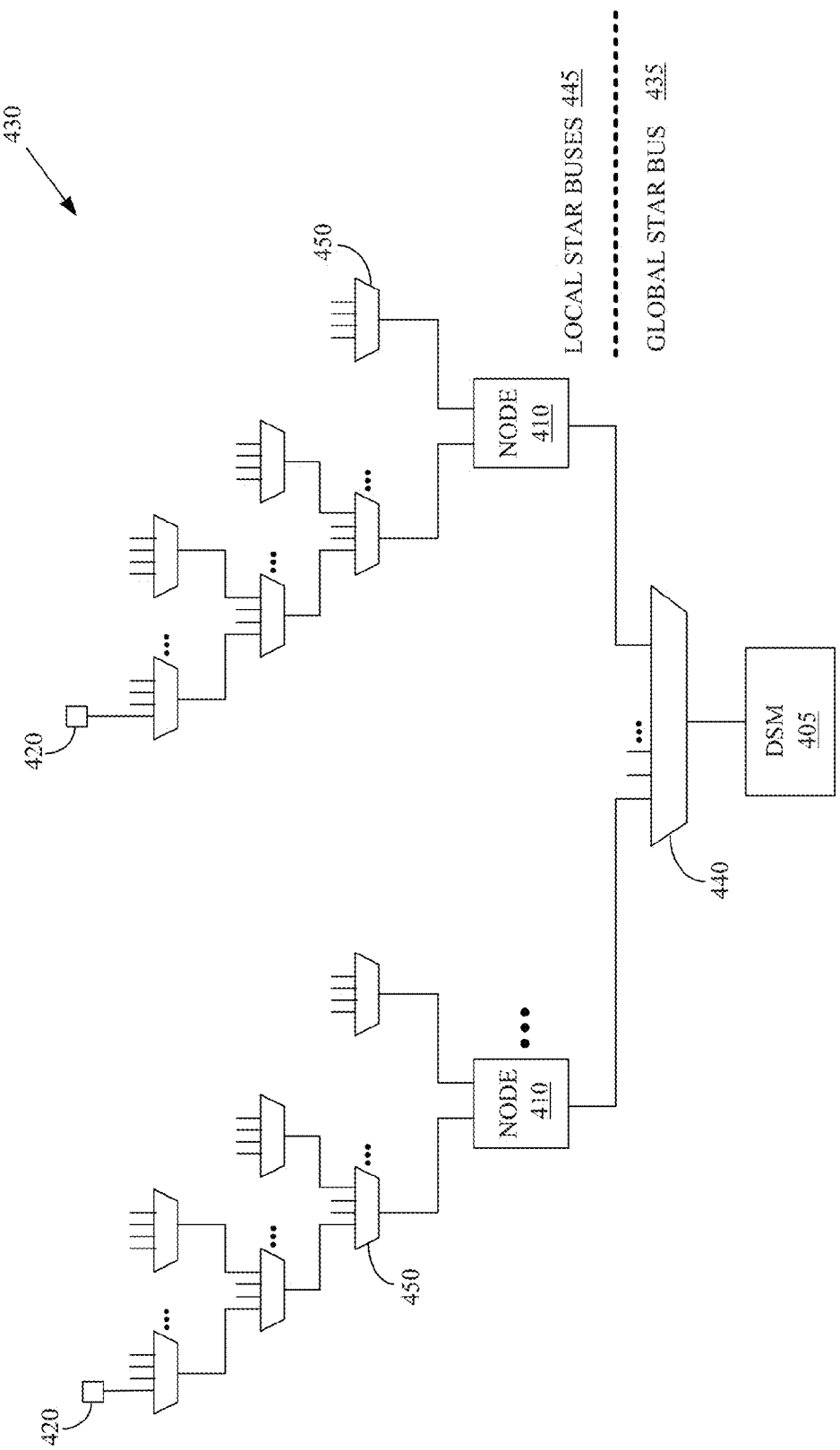
FIG. 4B conceptually illustrates a system for communicating signals generated on a local star bus to a DSM coupled to a global bus, in accordance with some embodiments.

FIG. 4B conceptually illustrates a processor-based system 430 (e.g., the processor-based system 100) for communicating signals generated on a local star bus to a DSM coupled to a global star bus, according to some embodiments. As illustrated, the processor-based system 430 includes a global star bus 435, the DSM 405, the nodes 410, local star buses 445, and the blocks 420. In some embodiments, the global star bus 435, the nodes 410, and the DSM 405 correspond to the bus 135, the nodes 130, and the DSM 125, respectively. As illustrated, the global star bus 435 may be implemented using one or more multiplexers 440 that receive input from the nodes 410. The output of the multiplexers 440 may be provided to the DSM 405. As discussed herein, different subsets of the lines of the global star bus 435 are allocated to the different nodes 410 so that the DSM 405 can unambiguously identify signals transmitted over the global star bus 435 by the different nodes 410. In FIG. 4, the nodes 410 monitor signals generated by logical entities or blocks 420 using corresponding local star buses 445 that may be implemented using a tree of multiplexers 450 that are controlled by corresponding configuration registers (not shown). Star buses are well-known in the art and, in the interest of clarity, are not discussed in detail herein.

Figure 4C:
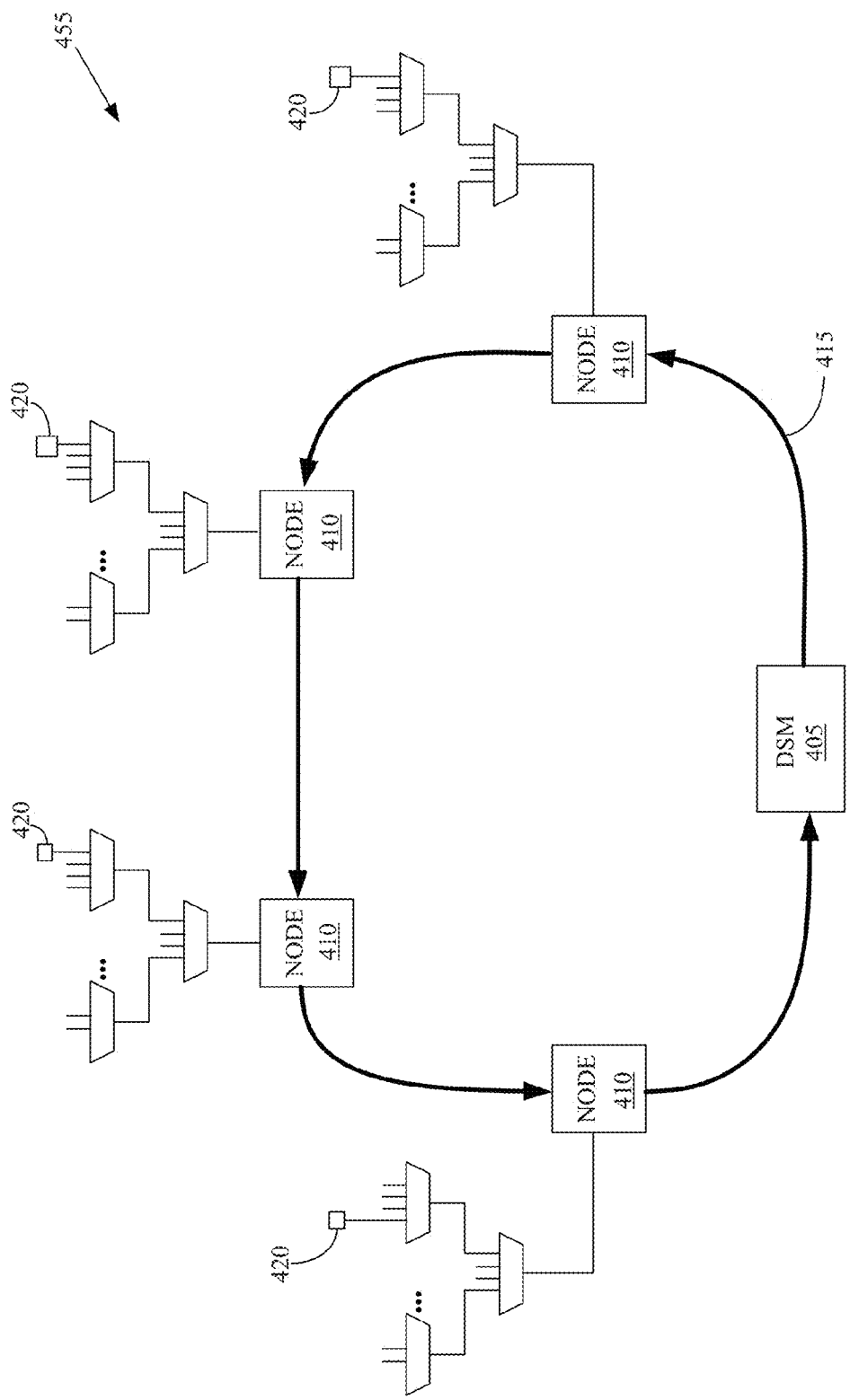
FIG. 4C conceptually illustrates a system for communicating signals generated on a local star bus to a DSM coupled to a global ring bus, in accordance with some embodiments.

FIG. 4C conceptually illustrates a processor-based system 455 (e.g., the processor-based system 100) for communicating signals generated on a local star bus to a DSM coupled to a global ring bus, according to some embodiments. As illustrated, the processor-based system 455 includes the global ring bus 435, the DSM 405, the nodes 410, the local star buses 445, and the blocks 420. In some embodiments, the global ring bus 435, the nodes 410, and the DSM 405 correspond to the bus 135, the nodes 130, and the DSM 125, respectively. As illustrated, the DSM 405 communicates with one or more nodes 410 over a global ring bus 415. As discussed herein, different subsets of the lines of the global ring bus 415 are allocated to the different nodes 410 so that the DSM 405 can unambiguously identify signals transmitted over the bus by the different nodes 410. The nodes 410 monitor signals generated by logical entities or blocks 420 using corresponding local star buses 445 that may be implemented using a tree of multiplexers 450 that are controlled by corresponding configuration registers (not shown). The processor-based system 455 may therefore be referred to as a hybrid embodiment that includes both ring buses and star buses. Persons of ordinary skill in the art having benefit of the present disclosure should appreciate processor-based systems 400, 430, and 455 may be modified to use any combination of bus types for the local and global buses. For example, a first node 410 may use a local ring bus 425 and a second node 410 may use a local star bus 445.

Figure 5:
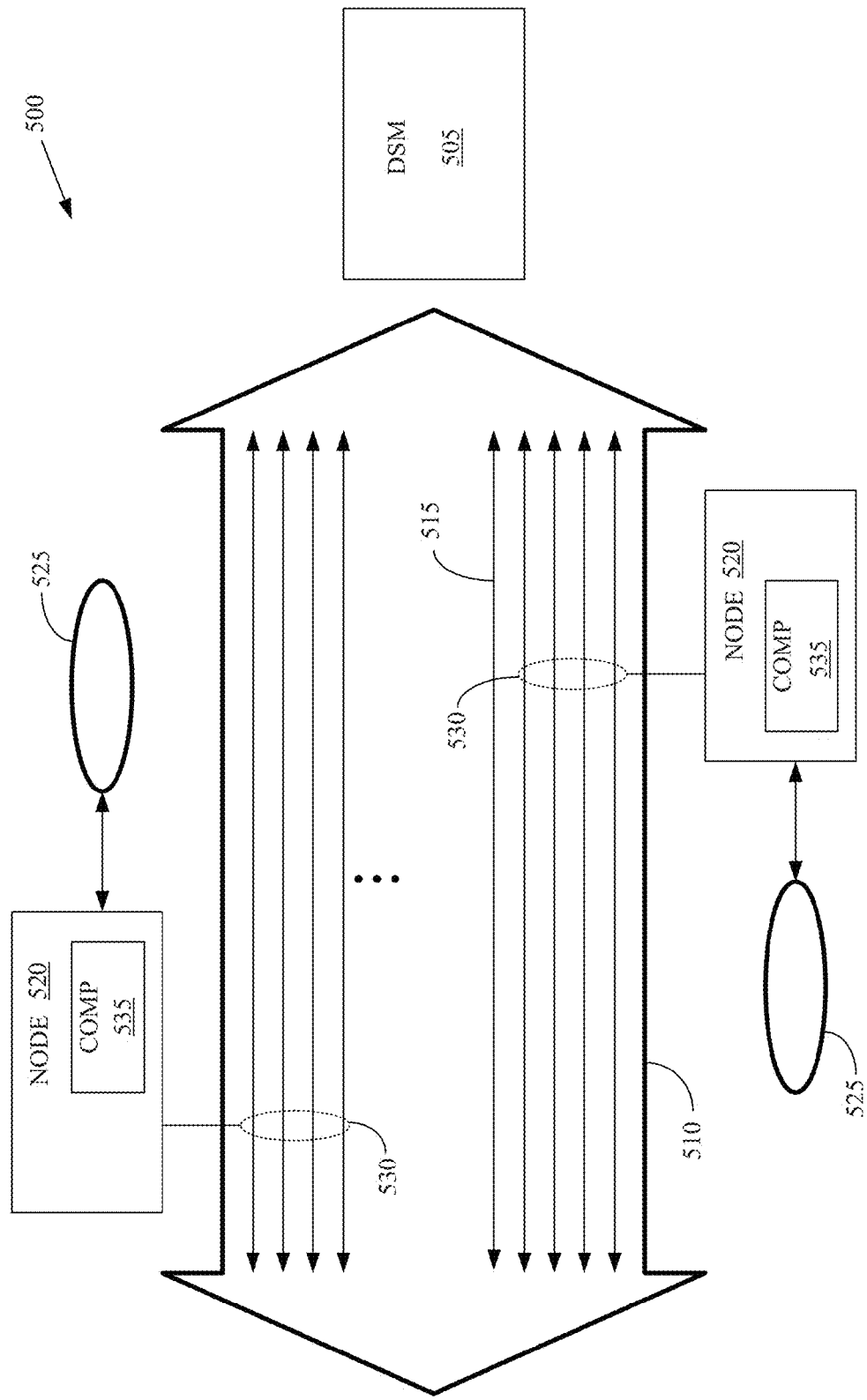
FIG. 5 conceptually illustrates a global bus for a processor-based system, in accordance with some embodiments.

FIG. 5 conceptually illustrates a global bus for a processor-based system 500 (e.g., the processor-based system 100), according to some embodiments. As illustrated, a DSM 505 is physically, electromagnetically, or communicatively coupled to a global bus 510. For example, the DSM 505 may be coupled to the global bus 510 using one or more multiplexers as described in FIG. 2. The global bus 510 includes a plurality of lines 515 (only one indicated by a reference numeral) that can carry data concurrently or in parallel with each other. The DSM 505 may therefore monitor signals that are asserted on the lines 515 of the global bus 510 and use the received signals to identify triggering events and generate debugging actions (or other actions) in response to the identified triggering events.

The processor-based system 500 also includes a plurality of nodes 520 that are configured to monitor signals carried on a corresponding local bus 525. Each of the nodes 520 may also be allocated a configurable subset 530 of the lines 515 of the global bus 510. The number of lines in the subset 530 may be predetermined or may be dynamically configurable, e.g., in response to instructions or code executed on the processor-based system 500. The nodes 520 can use their associated subset 530 of the lines 515 to convey signals to the DSM 505 and the subsets 530 of the lines 515 may be selected so that the DSM 505 can unambiguously determine which node 520 asserted the signals onto the corresponding lines 515. For example, the nodes 520 may be allocated mutually exclusive subsets 530 of the lines 515. In some embodiments, a portion of the lines 515 is allocated to the subsets 530 of the lines 515 and another portion of the lines 515 is reserved for carrying data such as trace information that the DSM 505 can use to monitor activities elsewhere in the processor-based system 500. For example, the global bus 510 may include thirty two lines 515 and eight of the lines 515 may be allocated to the subsets 530 of the lines 515. The remaining twenty four lines 515 may be reserved for carrying trace information directly to the DSM 505.

The nodes 520 may use the local bus signals to detect triggering events that can be used to generate debugging actions. In some embodiments, the nodes 520 include comparator logic 535 that is used to compare information received from the local bus 525 to detect triggering events, e.g., using pattern matching, field comparisons, permutation logic, or the like. The nodes 520 may then generate signals for debugging actions in response to detecting triggering events from the local bus 525. In some embodiments, the nodes 520 generate a trigger event signal that can be asserted onto the corresponding subset 530 of the lines 515. For example, the nodes 520 may assert a bit-1 on one of the lines 515 to indicate a triggering event that the DSM 505 may use to generate a debugging action. The nodes 520 may also concurrently assert additional data or trace information on the other lines 515 of their subset 530.

The DSM 505 may detect the trigger event signal received on the global bus 510 and may use this trigger event signal to generate a debugging action. The DSM 505 may also receive and use the additional data received on other lines 515 of the subset to generate the debugging action or for other purposes such as detecting other triggers. In some embodiments, the DSM 505 uses the trigger event signal from one node 520 in combination with other trigger event signals received from other nodes 520 to generate a debugging action. For example, the DSM 505 may receive a trigger event from one node 520 that may not cause a debug action, but the received trigger event signal may change the state of the DSM 505 so that one or more subsequent triggers cause the DSM 505 to generate a debug action.

The nodes 520 may also generate debugging actions locally. In some embodiments, the nodes 520 detect triggering events on the corresponding local bus 525 and use the triggering events to initiate or generate debugging actions such as stopping clocks, entering a processor debug mode, issuing interrupt code, controlling debug trace storage, or asserting a local irritator like a stall. The nodes 520 may also transmit signals using their subset 530 of the lines 515 to inform the DSM 505 that node 520 has performed a local debugging action. In some embodiments, the DSM 505 may or may not use this information. For example, the DSM 505 may ignore the signals or alternatively the DSM 505 may use the information to identify a trigger, e.g., in combination with other information received over the global bus 510, or to modify its state.

In some embodiments, the global bus 510, the nodes 520, and the DSM 505 correspond to the bus 135, the nodes 130, and the DSM 125, respectively.

Figure 6:
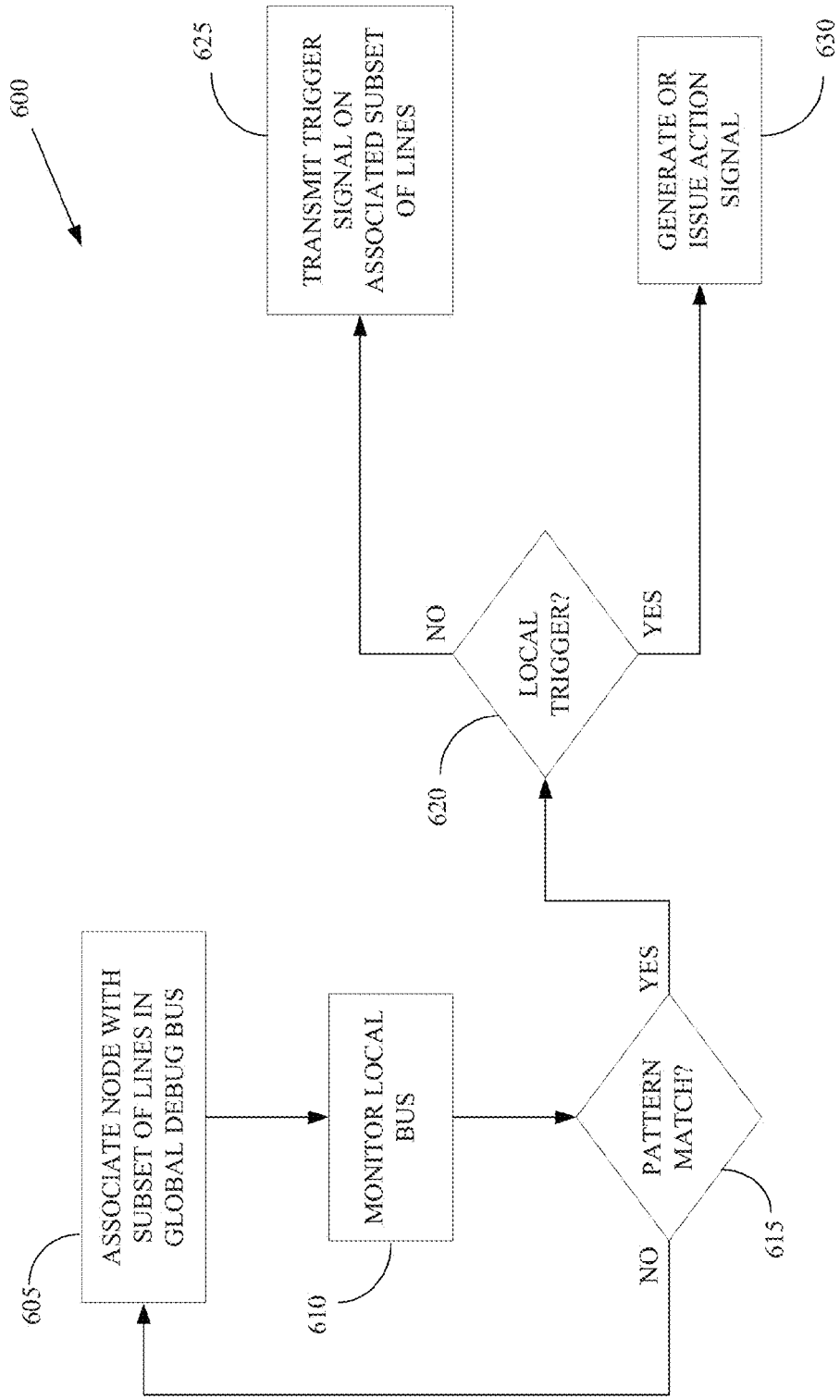
FIG. 6 conceptually illustrates a method that may be implemented in a node, in accordance with some embodiments.

FIG. 6 conceptually illustrates a method 600 that may be implemented in a node (e.g., the node 130), according to some embodiments. As illustrated, the node is associated (at 605) with a subset of the lines in a global bus that is monitored by a centralized DSM. As discussed herein, the subset of lines are associated (at 605) with the node so that the DSM can unambiguously identify signals asserted onto the global debug bus by the corresponding node. The node may then monitor (at 610) the local bus. As long as the node does not detect (at 615) a pattern that indicates a triggering event, the node continues to monitor (at 605) the local bus. When the node detects (at 615) a pattern match that indicates a triggering event, the node may determine (at 620) whether the triggering event indicates a local trigger for a debugging action that can be generated by the node or a trigger that should be passed on to the DSM.

If the node determines (at 620) that the detected trigger event is not a trigger for a local debugging action, the node may transmit (at 625) a signal indicating the trigger event to the DSM over its associated subset of lines (e.g., the subset 530 of the lines 515). If the node determines (at 620) that the detected trigger event is a trigger for a local debugging action, the node may generate or issue (at 630) an action signal indicating the local debugging action. In some embodiments, the node also generates (at 630) an action signal that can be asserted onto the subset of lines of the global debug bus to inform the DSM of the trigger or the local debugging action. The DSM may use the action signal to monitor states of the node or to trigger other debugging actions, e.g., by using the action signal in combination with other action signals generated by other nodes or signals received directly by the DSM. Persons of ordinary skill in the art having benefit of the present disclosure should appreciate that not all embodiments of nodes may be able to generate local debugging actions in response to triggering events. Some embodiments of nodes may be passive and may not be able to generate local debugging actions. The steps 620, 630 are therefore optional and may not be implemented by some embodiments of the nodes.

Figure 7:
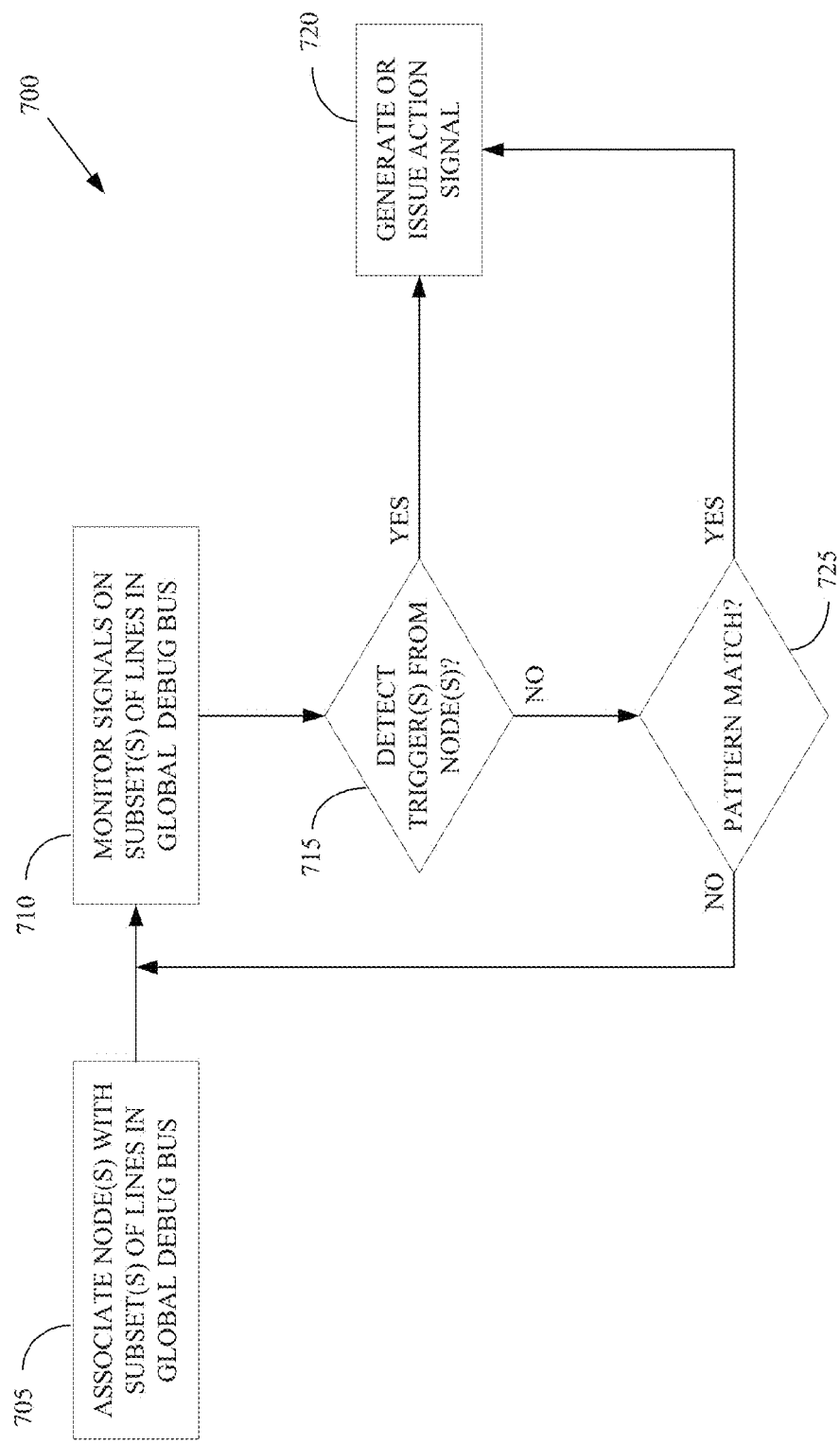
FIG. 7 conceptually illustrates a method that may be implemented in a debugging state machine (DSM) associated with one or more nodes, in accordance with some embodiments.

FIG. 7 conceptually illustrates a method 700 that may be implemented in a debugging state machine (DSM) associated with one or more nodes, according to some embodiments. As illustrated, the nodes associated with the DSM are allocated (at 705) subsets of lines (e.g., the subset 530 of the lines 515) of a global debug bus so that the DSM can unambiguously determine which node transmitted information received by the DSM over the global debug bus. The DSM may then monitor (at 710) signals transmitted on the allocated subsets of lines. In some embodiments, the DSM also concurrently monitor signals transmitted on other lines of the global debug bus that are not allocated to nodes. If the DSM detects (at 715) a trigger signal asserted on to one of the subsets of lines by a corresponding node, the DSM may then generate or issue (at 720) a signal indicating a debugging action in response to the trigger signal. In some embodiments, trigger signals detected on the subsets of lines are used individually or in combination with other trigger signals or trace information received over the global debug bus to trigger the generation (at 720) of the debugging action.

The DSM may also be configured to detect triggering events from trace information conveyed on the allocated subsets of lines or other unallocated lines of the global debug bus. For example, the DSM may also generate (at 720) a debugging action in response to detecting (at 725) a pattern match that indicates a triggering event that indicates that a bug has been detected and may be addressed by performing the debugging action. Persons of ordinary skill in the art having benefit of the present disclosure should appreciate that some embodiments of the method 700 may not perform the steps (715, 720, 725) in the order indicated in the embodiment depicted in FIG. 7. For example, alternative embodiments of the method 700 may perform the steps (715, 720, 725) concurrently.

Embodiments of processor systems that can implement distributed on-chip debug triggering as described herein (such as the processor-based system 100) can be fabricated in semiconductor fabrication facilities according to various processor designs. In some embodiments, a processor design is represented as code stored on a computer readable media. Exemplary codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of non-transitory program storage medium (e.g., a computer readable storage medium) or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The methods illustrated in FIGS. 6-7 may be governed by instructions that are stored in the program storage medium and that are executed by at least one processor of a computer system (e.g., the CPU 140 of the processor-based system 100, etc.). Each of the operations shown in FIGS. 6-7 may correspond to instructions stored in the program storage medium. The computer readable instructions stored on the program storage medium may be in source code, assembly language code, object code, or other instruction format that is interpreted and/or executable by one or more processors. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A processor, comprising:
  a first bus comprising a plurality of lines;
  a debugging state machine configurable to monitor the plurality of lines of the first bus;
  a second bus different from the first bus; and
  a first node coupled to the first bus and the second bus, the first node to:
    in response to detecting that a first triggering event received via the second bus is a first local debug event, process the first local debug event at the first node and not sending signals via the first bus to the debugging state machine regarding the first local debug event; and
    in response to detecting that a second triggering event received via the second bus is a first global debug event different from a local debug event, provide signals to the debugging state machine indicating the first global debug event using a first subset of the plurality of lines that is allocated to the first node.

2. The processor of claim 1, wherein the debugging state machine is configurable to initiate at least one debugging action in response to the signals provided by the first node using the first subset.

3. The processor of claim 1, comprising:
  a third bus;
  a second node coupled to the third bus and the first bus, the second node to:
    in response to detecting that a third triggering event received via the third bus is a second local debug event, process the second local debug event at the second node; and
    in response to detecting that a fourth triggering event received via the second bus is a second global debug event, provide signals to the debugging state machine indicating the second global debug event using a second subset of the plurality of lines that is allocated to the second node, the first subset of the plurality of lines not including lines of the second subset of the plurality of lines.

4. The processor of claim 3, wherein the plurality of lines of the first bus comprise a third subset of the lines that is not allocated to a node.

5. The processor of claim 4, wherein the debugging state machine is configurable to monitor the third subset of lines to detect triggering events and initiate debugging actions in response to detecting triggering events.

6. The processor of claim 1, wherein the first subset of the plurality of lines includes a first line to indicate that the second triggering event has occurred and a second line to concurrently provide a signal indicative of a type of the second triggering event.

7. The processor of claim 1, wherein the first bus is one of a ring bus or a star bus.

8. The processor of claim 7, wherein the second bus is one of a ring bus or a star bus.

9. The processor of claim 1, wherein a processing capacity of the debugging state machine is larger than a processing capacity of the first node.

10. The processor of claim 9, wherein the processing capacity of the debugging state machine is at least an order of magnitude larger than the processing capacity of the first node.

11. A method, comprising:
  detecting, at a first node of a plurality of nodes of a processor that are communicatively coupled to a debugging state machine a first triggering event and a second triggering event based on signals received via a first bus;
  in response to determining that the first triggering event is a first local debug event, processing the first local debug event at the first node and not sending signals via the first bus to the debugging state machine regarding the first local debug event; and
  in response to determining that the second triggering event is a first global debug event different from a local debug event, providing signals to the debugging state machine using a first subset of plurality of lines of a second bus, wherein the first subset is allocated to the first node.

12. The method of claim 11, comprising initiating, at the debugging state machine, at least one debugging action in response to the signals provided by the first node using the first subset.

13. The method of claim 11, further comprising:
- detecting, at a second node of the plurality of nodes and based on signals received via a third bus, a third triggering event and a fourth triggering event;
- in response to determining that the third triggering event is a second local debug event, processing the second local debug event at the second node; and
- in response to determining that the fourth triggering event is a second global debug event, providing signals to the debugging state machine using a second subset of the plurality of lines of the second bus, wherein the second subset is allocated to the second node and does not include lines of the first subset of the plurality of lines.

14. The method of claim 13, wherein the plurality of lines of the second bus includes a third subset of the plurality of lines that is not allocated to a node.

15. The method of claim 14, comprising monitoring, at the debugging state machine, the third subset of lines to detect triggering events and initiate debugging actions in response to detecting triggering events.

* * * * *